United States Patent
Belbin

(10) Patent No.: US 9,390,689 B2
(45) Date of Patent: Jul. 12, 2016

(54) NEED-BELOW PROCESSING ACROSS Z-BAND BOUNDARIES

(71) Applicant: CANON KABUSHIKI KAISHA, Tokyo (JP)

(72) Inventor: Joseph Leigh Belbin, Mount Colah (AU)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 14/470,532

(22) Filed: Aug. 27, 2014

(65) Prior Publication Data

US 2015/0062155 A1    Mar. 5, 2015

(30) Foreign Application Priority Data

Aug. 30, 2013    (AU) .................................. 2013222018

(51) Int. Cl.
*G09G 5/377* (2006.01)
*G06K 15/02* (2006.01)
*G06T 11/20* (2006.01)

(52) U.S. Cl.
CPC ............ *G09G 5/377* (2013.01); *G06K 15/1849* (2013.01); *G06T 11/203* (2013.01); *G09G 2340/10* (2013.01); *G09G 2340/12* (2013.01)

(58) Field of Classification Search
CPC ........ G06T 15/405; G06T 15/005; G06T 1/60
See application file for complete search history.

(56) References Cited

U.S. PATENT DOCUMENTS

| | | | |
|---|---|---|---|
| 9,165,368 B2 * | 10/2015 | Rafii | G06K 9/00201 |
| 2006/0285152 A1 | 12/2006 | Skillen | |
| 2008/0082907 A1 | 4/2008 | Sorotokin et al. | |
| 2008/0094411 A1 | 4/2008 | Parenteau et al. | |
| 2008/0297534 A1 * | 12/2008 | Liu | G06F 17/211 |
| | | | 345/629 |

* cited by examiner

*Primary Examiner* — Todd Buttram
(74) *Attorney, Agent, or Firm* — Canon USA Inc. IP Division

(57) ABSTRACT

A method for producing a set of compositing instructions to render a region of a page receives a plurality of objects partitioned into at least two z-order bands, the received objects being associated with at least one transparency group that spans at least two bands. A transparency characteristic for at least one object within a z-order band is established. The method identifies a transparency group in the one band which is active in at least one other band and contains at least one object active in the region, determines contributing objects for the region in the band using the identified transparency group, the determination being performed by at least interpreting a change of the transparency characteristic of at least one object in the band, and produces a set of compositing instructions to render the region using the determined contributing objects.

19 Claims, 13 Drawing Sheets

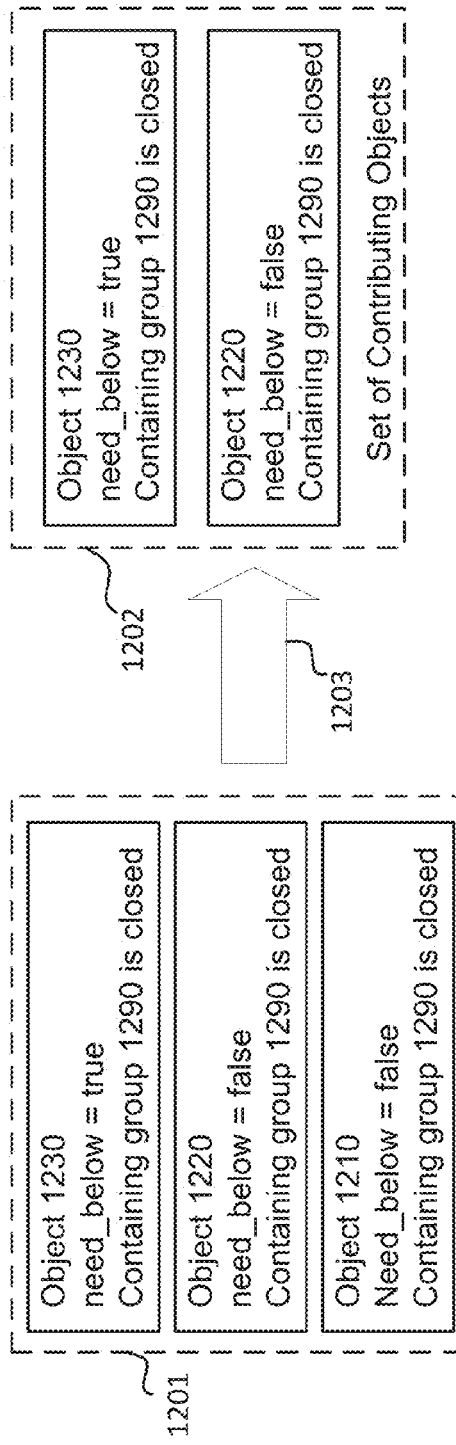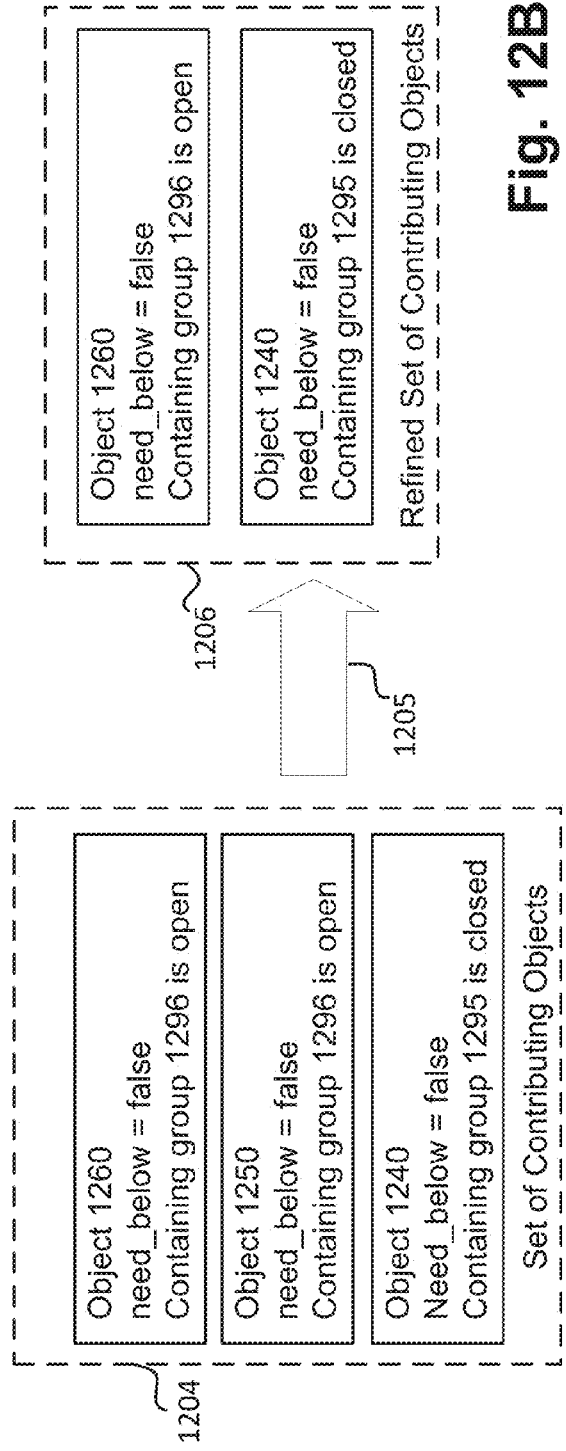

NEED-BELOW PROCESSING ACROSS Z-BAND BOUNDARIES

REFERENCE TO RELATED APPLICATION(S)

This application claims the benefit under 35 U.S.C. §119 of the filing date of Australian Patent Application No. 2013222018, filed Aug. 30, 2013, hereby incorporated by reference in its entirety as if fully set forth herein.

TECHNICAL FIELD

The current invention relates to computer graphics and, in particular, to a method for efficiently rendering groups of graphical objects. The current invention also relates to a computer program product including a computer readable medium having recorded thereon a computer program for efficiently rendering groups of graphical objects.

BACKGROUND

Computer software systems such as word processors, page composition programs and the like are generally configured to manipulate collections of graphical objects such as bitmap images, photographic images, text, and filled shapes. It is sometimes desirable to combine these objects in ways that resemble the effects obtained in a photographic darkroom, such as dodging and burning. It is also desirable to allow the user to perform mathematical operations on the pixel values such as add, subtract, multiply, minimum and maximum. Such actions are referred to in the art as blending modes or compositing operators. Graphical objects may be collected into a group and the group rendered onto the background as if it were a single object, possibly using one of the available compositing operations. An example of a group can be found in the PDF specification (Adobe Systems, Inc.). According to the PDF specification, objects are often grouped to create specific visual (transparency) effects and so that the objects within the group can be composited together and the result can then be composited with the background. Such groups are often referred to as transparency groups.

A common method used to process graphical objects is to convert them into an intermediate format made up of non-overlapping regions or sub-objects. An important technique when creating such an intermediate format is detecting when an overlying object obscures one or more other objects, in order to avoid producing redundant drawing instructions for the occluded objects. Determining whether a graphical object obscures objects in the background of the graphical object is generally a simple process. However, this determination can be complicated if the particular object is contained within a group, as the obscurance properties of the particular object may rely on later (overlying) objects within the relevant group. For example, a masking object forming part of the group may partially overly the particular object, thereby presenting the background of the group for representation, perhaps through compositing with further overlying objects.

An optimisation to the technique of producing an intermediate format is to partition the graphical objects into multiple z-ordered batches or bands of objects, and generate an intermediate format representation of each batch. Once all batches have been processed, the set of intermediate format representations can be merged into a final intermediate format representation. However when objects are partitioned into z-ordered batches, it can be difficult to determine efficiently whether an object obscures the background, as the obscurance properties of the object may depend on other objects lying in a separate batch.

It is therefore desirable to provide a means to efficiently determine the obscurance properties of objects contained within z-ordered partitions.

SUMMARY

Where a group of objects lies entirely within a z-band, there is no significant problem as the information regarding all objects in the group is available for optimisation of the z-band. Where the group of objects spans more than one z-band, it is necessary to assume that other objects, including those objects not yet received for render processing, may impact upon the transparency characteristics of the objects currently being processed.

According to one aspect of the present disclosure there is provided a method for producing a set of compositing instructions to render a region, the method comprising:

receiving a plurality of objects corresponding to the region partitioned into at least a first z-order band and a second z-order band, wherein each object is associated with a processing flag identifying whether the underlying objects contribute to rendered output;

identifying a transparency group spanning at least the first and the second z-order bands, the transparency group including at least some of the received plurality of objects, wherein the transparency group defines compositing of said group with other received objects;

selecting objects contributing to the rendered output of the region by changing the processing flag associated with at least one object in said first z-order band if said at least one object belongs to the identified transparency group; and producing a set of compositing instructions to render the region by processing the selected contributing objects.

According to another aspect of the present disclosure, there is provided a method for producing a set of compositing instructions to render a region of a page, the method comprising:

receiving a plurality of objects partitioned into at least two z-order bands, the received objects being associated with at least one transparency group influencing a compositing order for the objects within the page, in which at least one transparency group spans at least two bands;

establishing a transparency characteristic for at least one object within a z-order band, the transparency characteristic identifying a processing of the object with respect to underlying objects;

identifying a transparency group in the one band which is active in at least one other band and which contains at least one object active in the region;

determining contributing objects for the region in the band using the identified transparency group, the determination being performed by at least interpreting a change of the transparency characteristic of at least one object in the band; and producing a set of compositing instructions to render the region by processing the determined contributing objects.

Typically the method determines the active objects in the region for one said band, where the region is determined as an intersection of a plurality of objects.

Preferably the transparency group is identified by at least one of group start data and group end data.

Advantageously the determining of the contributing objects further comprises an obscurance test performed independently for each transparency group within the band.

In one implementation the changing the transparency characteristic comprises changing the transparency characteristic of at least one object in the band contributing to the identified transparency group.

Preferably the determining of contributing objects further comprises for each object within the band, changing the transparency characteristic so that each object within the band is considered to be a contributing object.

In some implementations the determining of the contributing objects comprises performing the obscurance test independently for each transparency group in the band wherein, for each transparency group, the obscurance test comprises:
identifying a top opaque object; and
discarding objects underlying the identified top opaque object in the transparency group from a set of contributing objects.

Typically the transparency characteristic is at least one of received with the objects, and determined from an opacity of each object and a compositing operator associated with the object.

Other aspects are also disclosed.

BRIEF DESCRIPTION OF THE DRAWINGS

At least one embodiment of the present invention will now be described with reference to the following drawings, in which:

FIG. 12A shows the results of the determination of contributing objects process on an example set of active objects;

FIG. 12B shows the results of the refinement of contributing objects process on an example set of contributing objects.

DETAILED DESCRIPTION INCLUDING BEST MODE

Context

Figure 1:
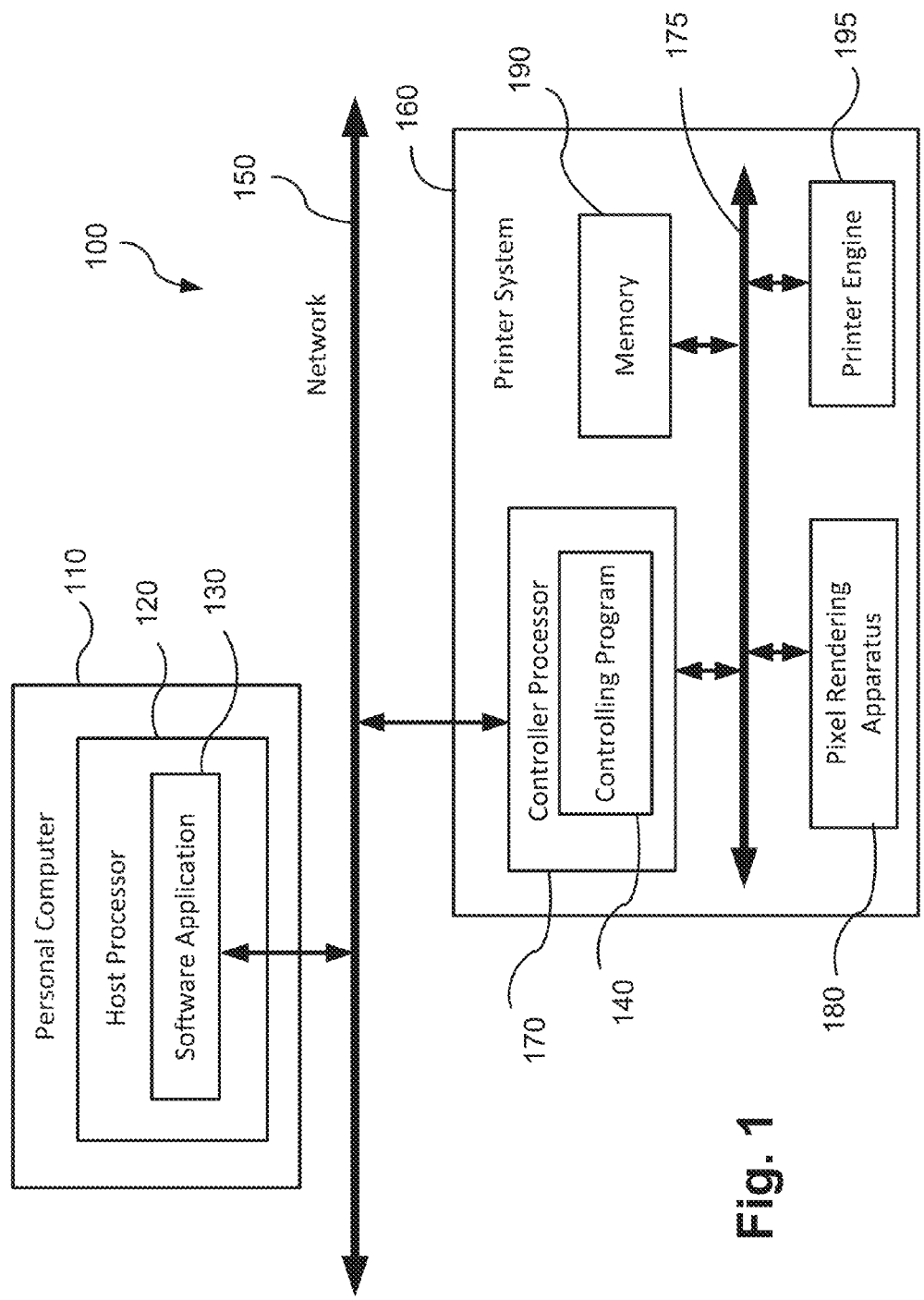
FIG. 1 is a schematic block diagram of a data processing architecture within which the arrangements described may be practised.

Print rendering systems are normally provided or input with a source document in a page description language (PDL), for example Portable Document Format (PDF), developed by Adobe Systems Inc. Such systems generate pixel output that is suitable for sending to the printer hardware for drawing on an output medium, such as paper. Such print rendering systems may be configured to operate within computer devices, where the interconnected printer device is relatively simple and can accept only pixel data), or more typically, within printer devices, where the printer device has a computational capacity to interpret a higher-level representation of the page to be printed.

A simple system may for example take drawing requests or instructions from the PDL document and render the drawing instructions therein as pixel data directly into a full-page frame-buffer. A typical method for performing this is known as Painter's algorithm. Alternatively, the data can be rendered by converting between one or more intermediate formats. Typically, the PDL description is processed into the intermediate format description, and the intermediate format description is rendered into pixel data. The present disclosure relates to a type of system that uses a specific intermediate format, known as a fillmap data structure, or simply a fillmap.

FIG. 1 shows a schematic block diagram of an exemplary pixel rendering system 100 for rendering computer graphic object images which may be processed by the disclosed method for fillmap processing. The pixel rendering system 100 comprises a personal computer 110, representing an exemplary computing device, connected to a printer system 160 through a network 150. The network 150 may be a typical network involving multiple computing devices, including tablet devices, PDAs and the like, or may be a simple connection between a single computing device and the printer system 160. The network 150 may be wired or wireless, and may include servers, routers or other interconnections between wired or wireless sub-networks.

The personal computer 110 comprises a host processor 120 for executing a software application 130, such as a word processor or graphical software application.

The printer system 160 comprises a controller processor 170 for executing a controlling program 140, a pixel rendering apparatus 180, memory 190, and a printer engine 195, each coupled via a bus 175. The pixel rendering apparatus 180 operates to rasterise image data to form pixel data, and is preferably provided in the form of an application specific integrated circuit (ASIC) coupled via the bus 175 to the controller processor 170, and the printer engine 195. However, the pixel rendering apparatus 180 may also be implemented in software, for example stored in the memory 190 and executed in the controller processor 170 or another embedded processor (not shown).

The controlling program 140 is typically stored in the memory 190, which is also used for temporary storage of print data during the processing performed within the printer system 160. Typically the memory 190 is formed by a combination of memory types including read-only memory (ROM), non-volatile random-access memory (RAM) and volatile RAM. Quite often the controlling program 140 is stored in ROM and cannot be altered after manufacture, without replacement of the ROM. Where the controlling program 140 is stored in non-volatile RAM, such affords the possibility of upgrades or changes to the controlling program 140 from time to time, provided sufficient memory capacity is available. In some instances the non-volatile RAM may be formed by magnetic disk drive or similar storage device. As such the memory 190 includes or is formed by non-transitory tangible computer readable storage media within which the controlling program 140, at least, may be stored. The controlling program 140 may be supplied to the printer system 160 for such storage via portable non-transitory tangible computer readable storage media connectable to the printer system 160, or via transitory non-tangible computer readable transmission media including, for example, the network 150.

In the pixel rendering system 100, the software application 130 creates page-based documents where each page contains objects such as text, lines, fill regions, and image data. The software application 130 sends a high-level description of the page (for example, a PDL file) via the network 150 to the controlling program 140 that executes in the controller processor 170 of the printer system 160.

The controlling program 140 receives the high-level description of the page from the software application 130, and processes the graphical objects to generate a fillmap (intermediate format) representation of the page. The fillmap representation will be discussed in further detail below.

The controlling program 140, executed on the controller processor 170, is also responsible for allocating memory capacity within the memory 190 for the pixel rendering apparatus 180, initialising the pixel rendering apparatus 180, and instructing the pixel rendering apparatus 180 to start rendering the fillmap.

The pixel rendering apparatus 180 then uses the fillmap to render the page to pixels. The output of the pixel rendering apparatus 180 is colour pixel data, which may be used by the printer engine 195 to reproduce the pixel data upon a hard copy medium such as paper.

Figure 4:
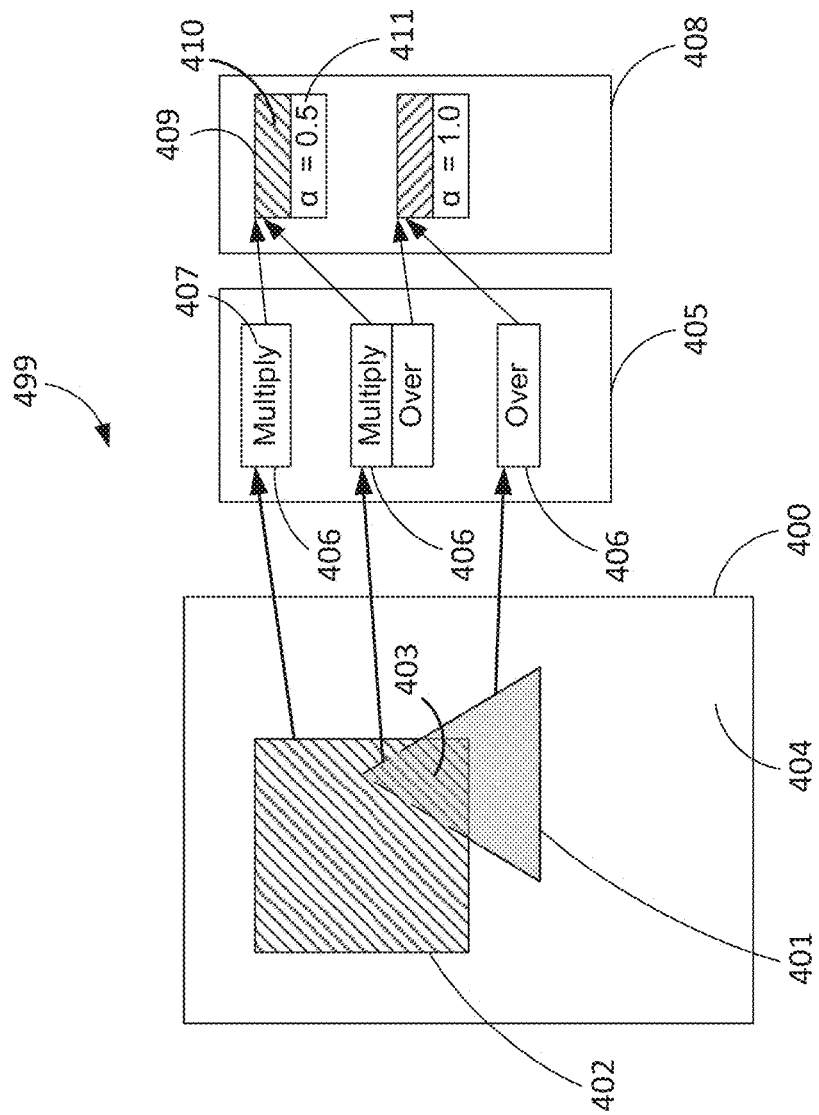
FIG. 4 is an illustration of the structure of a fillmap.

A fillmap describes the content of a single page in a print document. The structure of a fillmap 499 is illustrated in FIG. 4. In the fillmap 499, the content of a page 400 to be reproduced by printing, in this case partially overlapping square and triangle objects formed over a background, is divided into non-overlapping regions 401, 402, 403, including a background region 404. Each region of a fillmap is an area containing a particular combination of contributing PDL objects. The extent of the each region is described by edges that are aligned with the pixel grid able to be printed by the print engine 195. The content of each region 401-403 is defined by a set of compositing stacks 405. In this example, there is no compositing stack illustrated for the background region 404 as such can be assumed in an OVER compositing operation 406 associated with the lowest z-order object level. Other implementations may insert an entry representing the background in the compositing stack. Each compositing stack is an ordered list of level appearances 406, each of which corresponds to an object that contributes to the appearance of the corresponding region. Each level appearance 406 references either a single fill or a set of fills in a fill store 408, generally formed within the memory 190. The level appearance 406 also defines one or more compositing operations 407 that are used to draw the group or object on the underlying objects. In the example of FIG. 4, the compositing operations MULTIPLY and OVER are used by the level appearances 407. A fill 409 describes the colour 410 and alpha 411 for the pixels of an object, and the collection of fills 408, the regions on the page 400, and the compositing stacks 405, together form the fillmap 499 for the page 400. Fills can include flat regions of colour, linear and radial gradients, and images. For example, a fill could consist of a red colour, a level appearance could composite the red fill on an underlying object using the MULTIPLY blend mode, and the compositing stack would comprise the red level appearance along with the level appearances of the underlying objects. In summary, as shown in FIG. 4, the structure of the fillmap 499 may be considered an intermediate format which uses non-overlapping regions that reference compositing stacks that in turn reference fills.

A single fillmap can be produced for a page. Alternatively, the page contents can be partitioned into multiple z-ordered batches of objects and a fillmap can be created for each batch. These batches of z-ordered objects are known as z-bands. The combination of all these z-bands is a representation of the final page contents. In order to render the page, all the z-band fillmaps must first be merged into a single new fillmap. The process of combining multiple z-bands into a single fillmap is known as fillmap merging. The process of dividing the page contents in the z direction and merging the resultant fillmaps can be repeated many times until the final page representation has been created. One implementation of z-banding is to partition the page objects into ordered fixed-size batches, for example, batches of 5000 objects, and to merge the z-bands once a certain number of z-band fillmaps have been accumulated. The certain number is at least two, whilst a preferred implementation merges fillmaps when eight (8) fillmaps 204 have been stored to the memory 190. This use of z-bands can provide improved performance and lower memory usage compared to the creation of a single fillmap containing all the page objects. However, as discussed above, rendering problems can arise where a group of objects span more than one z-band. For example a group of 200 objects may have 75 objects ordered at the top of a z-band and 125 object ordered at the bottom of the next higher z-band.

Figure 2:
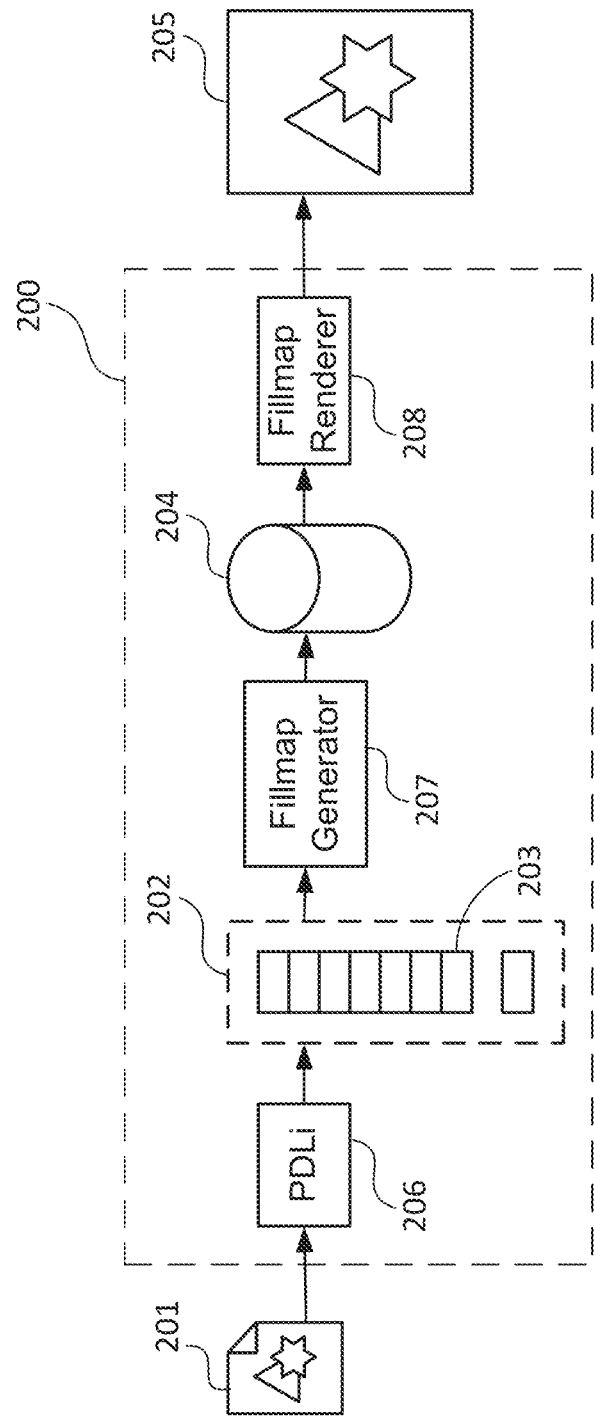
FIG. 2 is a diagram showing the flow of data from a page description language to output pixels.

FIG. 2 is a diagram showing the high-level processing flow of an example of a fillmap-based print rendering system 200. The print rendering system 200 is typically implemented in software as part of the controlling program 140 stored and executable within the printer system 160. A print document 201 is provided as an input to the system 200. The document 201 contains page description language (PDL) data and for example may have been created by a document generation application 130, such as a word processor, executing within the computer 110. Examples of PDLs include PDF, PostScript and XPS. The print document 201 is read and processed by a PDL interpreter (PDLi) 206. The PDLi 206 converts content of the document 201 into a sequence of drawing instructions. In some instances the document 201 is received by the system 200 as a batch, but otherwise the document 201 can be received as a streamed set of data. The PDLi 206, in either event, processes the document 201 in a streamed or incremental fashion where the contents are processed in z-order and converted into a sequence of drawing instructions. These drawing instructions are accumulated in a z-ordered display list 202. An entry 203 in the display list 202 can represent a drawing instruction. The display list 202 is then passed to a fillmap generator module 207 which converts the display list data into a fillmap intermediate format 204, which may be temporarily stored as schematically illustrated in FIG. 2, for example in the memory 190 of FIG. 1. When all the display lists 202 for a page have been received and processed by the fillmap generator 207, the fillmap 204 is passed to a fillmap renderer 208, which renders the fillmap 204 into a page of output pixel data 205 that is passed to a print engine, such as the printer engine 195, for hard-copy reproduction.

Display List and Fillmap Generation

Figure 3:
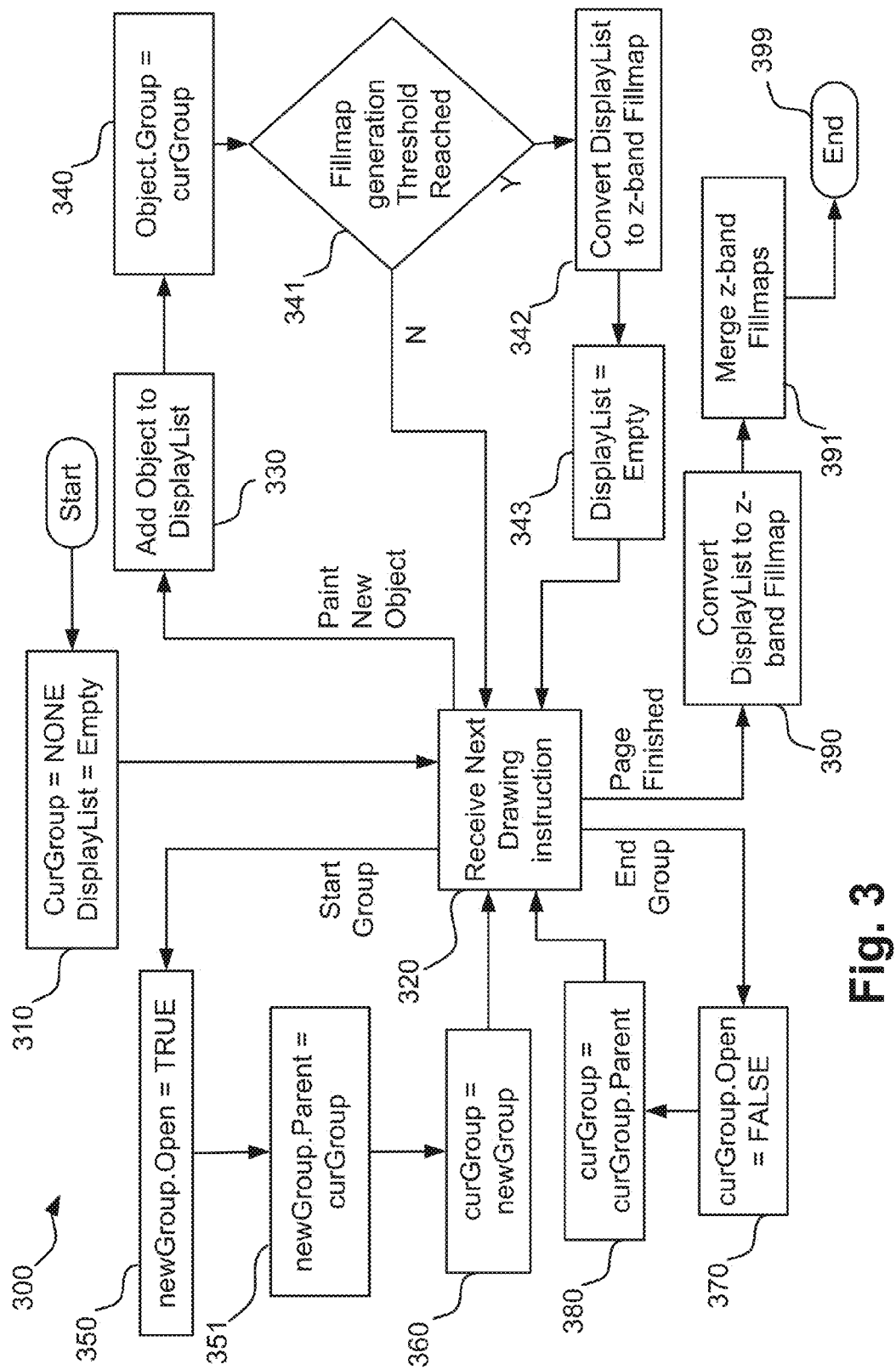
FIG. 3 is a flowchart illustrating the basic steps of display list generation and fillmap generation.

FIG. 3 shows a preferred process 300 of constructing a display list 202 for the page, and converting this display list 202 into a fillmap representation 204. The process 300 is performed by the controlling program 140 executed by the processor 170 and with the final fillmap and intermediate fillmaps being stored in the memory 190. The process 300 of FIG. 3 therefore merges the operations of the generation of the display list 202, the fillmap generator 207 and the fillmap store 204 into a single process. Before any objects or groups are received, an empty display list 202 is created and a current group variable is set to NONE, this being represented at step 310. The process 300 then receives drawing instructions from the PDL interpreter 206 at step 320.

If the drawing instruction is made to Paint a New Object, a new object is added to the display list 202 at step 330 and the group for that object is set to the current group at step 340. Note that where groups are nested, an object may also have a reference to the root group, which is the outermost group containing the object. The process 300 then determines, in step 341, if a threshold for fillmap generation has been reached. Possible thresholds that can be used include the number of objects in the display list 202, or the amount of the memory 190 used by the display list 202. If the fillmap generation threshold has been reached, the display list 202 is converted into a z-band fillmap at step 342 which is then stored in the memory 204/190 and the display list 202 is re-initialised to an empty state at step 343. Processing then returns to receive the next drawing instruction call from the document interpreter 206 at step 320.

If a drawing instruction is made to start a new transparency group, this being identified or defined by the data in the contents of the document 201, a new group descriptor is created. For example, in Adobe™ PDF, such data is generated by processing an XObject stream, which itself generates dependent objects. A status of the group is then set as OPEN at step 350, this representing that the following received objects are components of a particular transparency group until such time as that group is closed. As groups can be nested, and the nesting is simply based on the call sequence to start and end groups, the group descriptor contains an identifier of the parent, or containing group. This is set to the group identified by a variable, named here as the CurGroup variable, at step 351. CurGroup is then set at step 360 to point to the new group. Processing then returns to receive the next call from the document interpreter 206 at step 320.

If a drawing instruction received at step 320 is made to end the current group, the group identified by CurGroup is set as CLOSED at step 370. In Adobe™ PDF for example, when all of the component objects in an XObject stream have been generated (i.e. the end of the XObject stream is reached), the group that was started for the XObject can be closed. The CurGroup variable is then set to the containing Group of the just finished group at step 380. Processing then returns to receive the next call from the document interpreter at step 320.

The transparency group of objects is thereby defined or identified by the group start data and the group end data. In some implementations, a first object of a transparency group can include a count of the number of objects forming the transparency group, whereupon counting the receipt of further objects provides for a closing of the transparency group, such that the count is equivalent to one or both of the group start data and the group end data. Alternatively, as mentioned above, a group can be opened when a new stream of objects is encountered, and closed when the stream is exhausted.

If a drawing instruction received at step 320 is made to finish the page, the display list 202 is converted into a z-band fillmap at step 390 and again stored 204 in the memory 190. If there are multiple z-band fillmaps in the store 204, these are then merged into a single z-band fillmap at step 391 and the single fillmap again stored 204 in the memory 190. A single z-band fillmap representation for the page has now been created, and the display list and fillmap generation process 300 is complete, whereupon the process 300 ends at step 399.

Consider an example page consisting of three objects, the highest two of which are contained within a transparency group. In this example the fillmap generation threshold is set to two objects in the display list 202. The objects will be painted (rendered) in z-order from lowest object to highest object. The first drawing instruction received from the PDL interpreter 206 will be to paint the first object, and this will cause a new Display List object to be created and added to the display list 202. The second drawing instruction received from the PDL interpreter 206 will be to start a new transparency group. This will cause a new group descriptor to be created, which is marked as OPEN. The CurGroup variable will be set to point to the new group. The third drawing instruction received from the PDL interpreter 206 will be to paint the second object, and this will cause a new Display List object to be created and added to the display list 202. As the display list 202 now has two objects, the z-banding threshold has been reached and the display list 202 will be converted into a fillmap 204. In this example, with reaching the z-banding threshold no instruction to close the transparency group was received from the PDL interpreter 206, therefore, it can be seen that in this example there is an open group that spans between multiple z-bands.

Converting a Display List to a Fillmap

Once the set of objects for a z-band have been received into the printer system 160 and placed in the display list 202 as temporarily stored in the memory 190, a z-band fillmap can be generated as part of step 342. The objects are extracted from the display list 202 and partitioned into non-overlapping regions. The example fillmap described in FIG. 4 shows the partitioning of objects into non-overlapping regions 401, 402, 403, 404. The step of partitioning, which occurs during step 342, is not shown here and is a conventional step in generating a fillmap representation or many other intermediate print data representations of a set of objects. For each non-overlapping region, there is a subset of the input objects which are active in the region for the z-band—these make up the set of active objects for the region.

Figure 13:
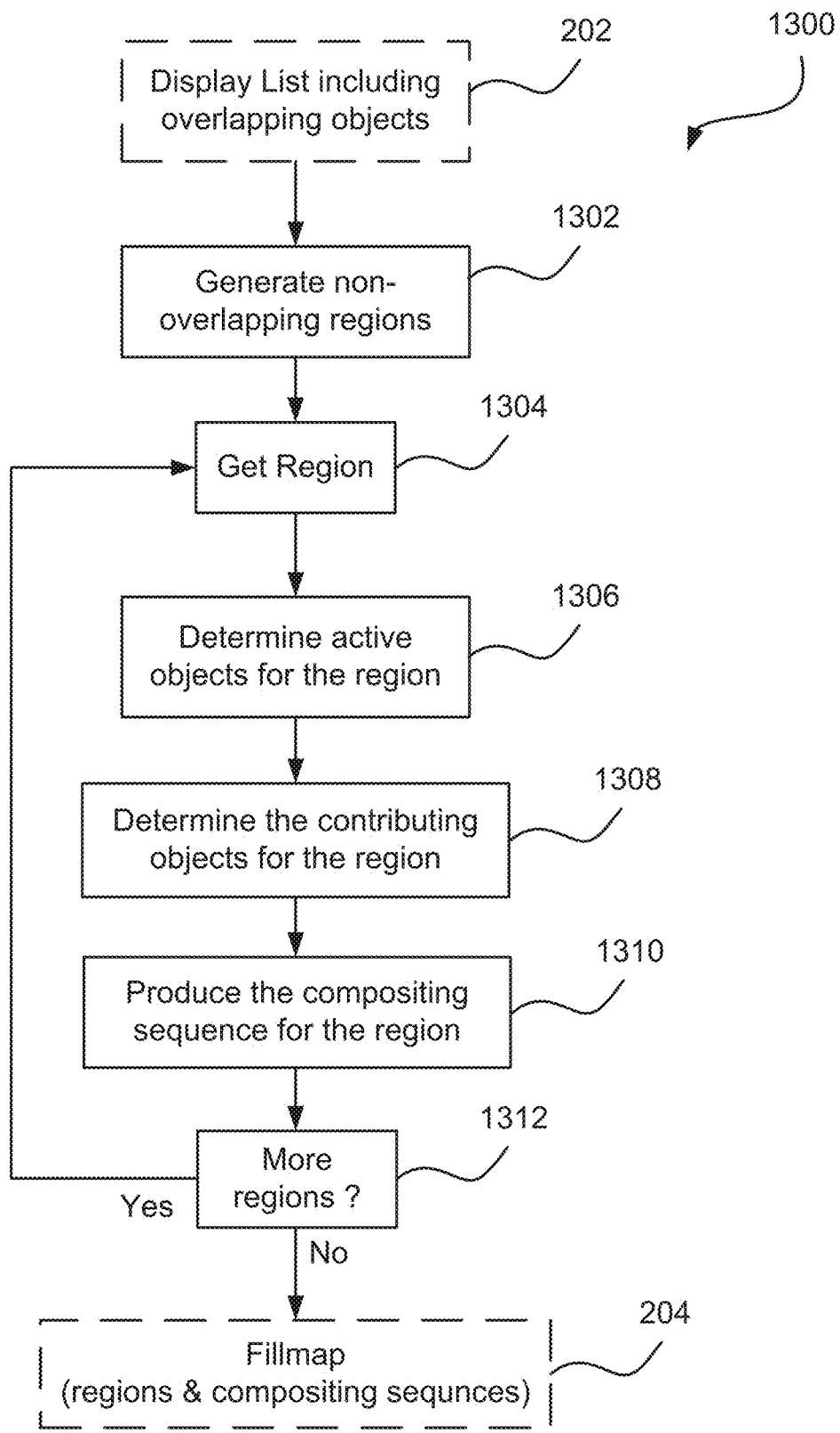
FIG. 13 is a schematic flow diagram representing the formation of a fillmap from a display list.

FIG. 13 shows a flowchart of a method 1300 for the formation of a fillmap 204 from a display list 202 as performed in step 342. The method 1300 is typically implemented in software stored in the memory 190 and executed by the processor 170. The display list 202 is an ordered listing of overlapping objects and is initially processed in step 1302 to generate non-overlapping regions, each region forming an area of the printable page where a combination of objects contribute to the output pixel values in the region. The regions are then processed individually where step 1304 gets a region for processing. In step 1306, the method 1300 determines those objects of the page that are active in the current region. Step 1308 then determines those of the active objects that actually contribute to the pixel values within the region. Step 1310 then forms a compositing sequence for the current region from the contributing objects for the current region. Step 1312 then determines whether any further regions require processing whereupon the method 1300 returns to step 1304. When all regions have been processed, the result of the method 1300 is a fillmap 204 represented by the non-overlapping regions each with a corresponding compositing sequence of objects that are active and contribute to the respective region.

For each region, the active objects for the region are processed to determine the set of contributing objects for the region. This is done by detecting which objects are fully obscured by an overlapping, higher level object. Any objects which are fully obscured do not contribute to the output, and are not needed in the compositing instructions for the region. FIG. 12A shows an example of determining (1203) a set of contributing objects for a region (1202) from a set of active objects for a region (1201). Here it can be seen that three active objects (1210, 1220 and 1230) are processed to remove the object 1210 which is obscured by the overlying object 1220, to produce the two contributing objects (1220 and 1230). In this example none of the objects were contained in an open group (i.e. the containing group 1290 of the objects 1210, 1220, 1230 is closed), and so no special transparency processing was required.

In the case where special transparency processing is required due to open groups, the determined set of contributing objects may be non-optimal. In this case a refining process is applied to the set of contributing objects, to produce a refined set of contributing objects. This processes objects on a group by group basis to remove objects which are obscured by overlying objects in the same group. FIG. 12B shows an example of determining (1205) a refined set of contributing objects for a region (1206) from a set of active objects for a region (1204). Here it can be seen that three contributing objects (1240, 1250 and 1260) are processed to remove or discard the object 1250 which is obscured by the overlying object 1260 which is in the same group 1296. This produces the two refined contributing objects (1240 and 1260). The object 1240 is retained because it is in a different group 1295.

In order to determine obscurance between objects, each object in the display list 202 has a transparency characteristic, indicating whether the object completely obscures any underlying objects. In the specific implementations described herein, the transparency characteristic is represented by a Boolean variable called a "need_below" flag. For example, a non-transparent (i.e., opaque) object with the blending operation OVER would have a corresponding need_below flag set to FALSE, indicating that the object completely obscures the background, while a non-transparent object with the blending operation MULTIPLY would have a corresponding need_below flag set to TRUE, indicating that underlying objects contribute to the output. If an object is contained within one or more transparency groups, the need_below status of the object also depends on the compositing operator of those containing groups. For example a non-transparent object with the blending operation OVER contained in a group with the blending instruction OVER would have a corresponding need_below flag set to FALSE, while an identical object contained in a group with the blending instruction IN would have a corresponding need_below flag set to TRUE. Determining the need_below status of an object is a conventional step in many different graphics rendering systems. In some implementations the transparency characteristic may be established in the system 100 by being specified in the PDL document 201 as received by the print rendering system 200. Alternatively, the PDL interpreter 206 can establish the transparency characteristic by defining or determining the need-below flag as a function of the opacity of the object and the compositing operation(s) applied to that object. Alternatively, when the object is added to the display list, the transparency characteristic can be established by defining or determining the need-below flag as a function of the opacity of the object and the compositing operation(s) applied to that object.

Figure 5:
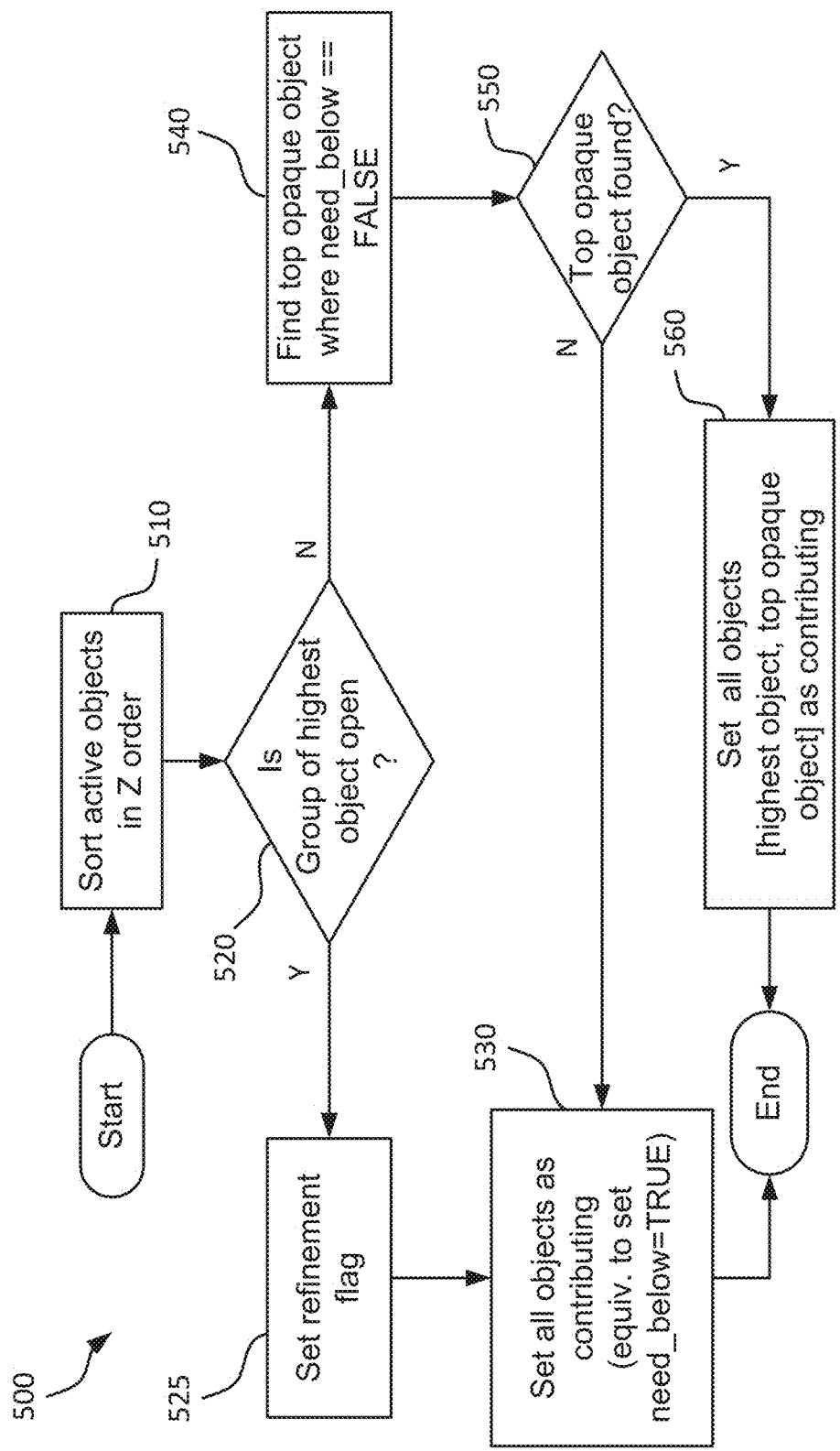
FIG. 5 is a flowchart illustrating the steps taken to process a set of active objects and determine the contributing objects for a region.

FIG. 5 shows a method 500 of determining the contributing objects from a set of active objects. The method 500 is preferably implemented in software executed by the processor 140 and stored in the memory 190. Firstly, in step 510, the active objects are sorted in z-order, so that they can be processed from highest to lowest. The highest active object is then examined in step 520 to determine if it is within a currently open group. An object is in an open group if the outermost group containing the object is set to OPEN. An object may be in an open group if a display list 202 is converted into a z-band fillmap after a group start call has been received, but before the matching group end call has been received.

If the highest active object is within an open group, the process 500 first sets the refinement flag at step 525. This indicates that the refining process should be applied to the generated set of contributing objects to remove objects which are obscured by other objects in the same group. The process 500 then in step 530 designates all active objects as contributing, regardless of the need_below status of the respective active object. As such, this approach has the effect of disregarding the need_below flag, or any need_below flag that is FALSE, which is equivalent to changing, or at least interpreting a change, of the need_below flag of the active objects to TRUE. If the highest object is not in an open group, as determined in step 520, the process 500 then determines in step 540 the top-most opaque object for the set of active objects. The top-most opaque object in the set of active objects for the region is the lowest object which contributes to the output for the region, i.e., the highest object with need_below=FALSE. If there is no top opaque object found, as determined at step 550, then all objects are set as contributing at step 530. Otherwise all objects from the highest object to the top opaque object are marked as contributing at step 560, whereupon the process 500 ends.

Refining Contributing Objects

Once the set of contributing objects have been obtained, if the refinement flag has been set, additional processing will be performed to further refine the set of contributing objects by removing objects that could not previously be eliminated on the basis of need_below alone. This refinement process operates by eliminating any object from a set of contributing objects which lie below an obscuring object. This is done by processing each object in the set of contributing objects in turn, and testing if there is a higher obscuring object in the same group. If this is the case, the underlying object will be removed from the set of contributing objects. This step is generally only performed if there is more than one contributing object.

Figure 6:
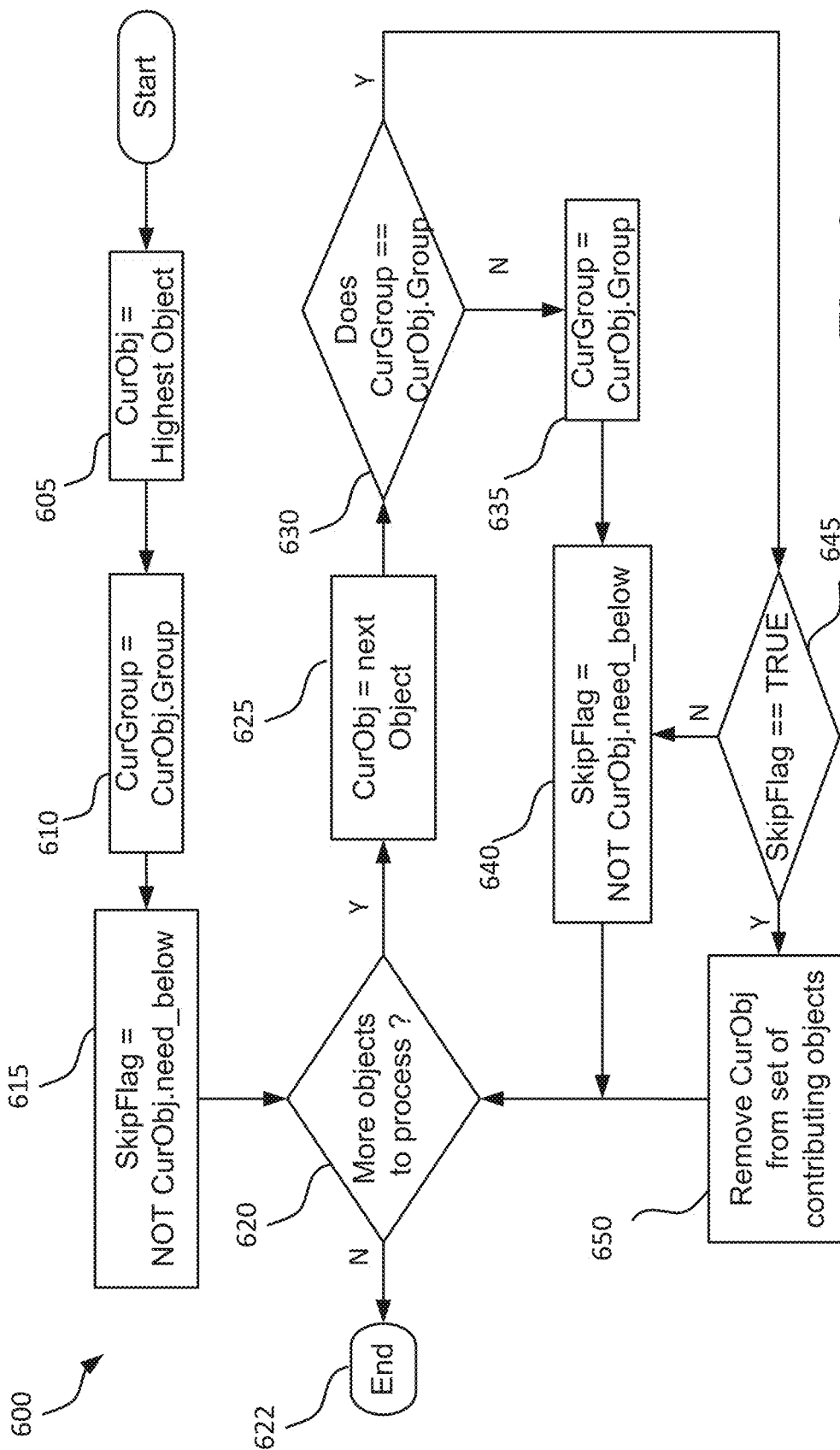
FIG. 6 is a flowchart illustrating the steps taken to refine the contributing objects for a region.

FIG. 6 is a flowchart demonstrating a process 600 for refining the set of contributing objects. Again, the process 600 is preferably implemented by software stored in the memory 190 and executable by the processor 140. In the process 600, the set of contributing objects is processed in order from highest contributing object to bottom-most contributing object. As shown in FIG. 6, in an initial step 605, a temporary variable CurObj is initialised to the highest contributing object, and a temporary variable CurGroup is set to the innermost group containing CurObj in step 610. This represents the group that is currently being processed to remove obscured objects. A temporary Boolean variable SkipFlag is then set in step 615 to the inverse of need_below flag of the CurObj. i.e., if need_below for CurObj is FALSE, SkipFlag will be set to TRUE. If the SkipFlag is set, such indicates that any underlying objects in the current group (designated by CurGroup) are obscured and can be removed from the set of contributing objects.

The process 600 then loops over all objects in the set of contributing objects for the region by testing, at step 620, whether there are more objects to process. If CurObj is the final object in the set, i.e., there are no more objects to process, the refinement process 600 is complete and the process ends at step 622. However, if there are more objects to process, the next object is retrieved and the CurObj variable is set to this object at step 625. The process 600 then tests at step 630 whether the object is in the current group—i.e. if the group of the current object is the same as CurGroup, then the objects is still in the group currently being processed. If the object is in the current group, the object is a candidate for removal from the set of contributing objects if it is obscured by a previous object in the same group, i.e., if the SkipFlag is set to TRUE. The value of the SkipFlag is then tested at step 645, and if the object is obscured—i.e. SkipFlag is equal to TRUE, the object is removed from the set of contributing objects at step 650. Processing then moves to the next object at step 620.

If step 630 determines that the object is not in the current group, or where step 645 determines that the SkipFlag is not set, then the object cannot be removed. In the case where the object is not in the same group—i.e. if the group of the object is not the same as CurGroup, obscurance processing has finished for CurGroup. In this case the CurGroup variable is updated at step 635 to refer to the group of the new (current) object', which is now being considered for obscurance processing. Following either from step 635 or from step 645 in the case where SkipFlag is FALSE, the SkipFlag is set to the inverse of need_below flag of the CurObj at step 640, and processing moves to the next object at step 620. This process is continued until all of the contributing objects have been examined for removal. It will be appreciated from the above that the obscurance test of step 645 is performed independently for each transparency group within the z-order band.

In the example shown in FIG. 12B, it can be seen that the highest object 1260 obscures the underlying object 1250 as the two objects are in the same group 1296. However the (next) underlying object 1240 is not obscured by object 1260 as they are in different groups (1295 and 1296 respectively).

Producing Drawing Instructions

Once the set of contributing objects for the region have been refined based on group and need_below status, the compositing instructions for a region can be produced. This is a simple matter of running through the contributing objects from lowest to highest, extracting the level appearance of the object, and adding the level appearance to a compositing stack. Compositing stacks can be hashed in order to allow sharing of identical compositing stacks between disjoint regions, thereby minimising memory consumption. Once the compositing stacks have been produced, they, together with their referenced level appearances, can be added to the fillmap representation of the page.

Rendering the Fillmap

Once the fillmap representation 499 of the page has been produced, each pixel in the output can be mapped to a non-overlapping region and thereby to a compositing instruction. To generate the output bitmap, the colour for each pixel in the bitmap can be generated by executing the appropriate set of compositing instructions.

Worked Example A

Figures 7A, 7B:
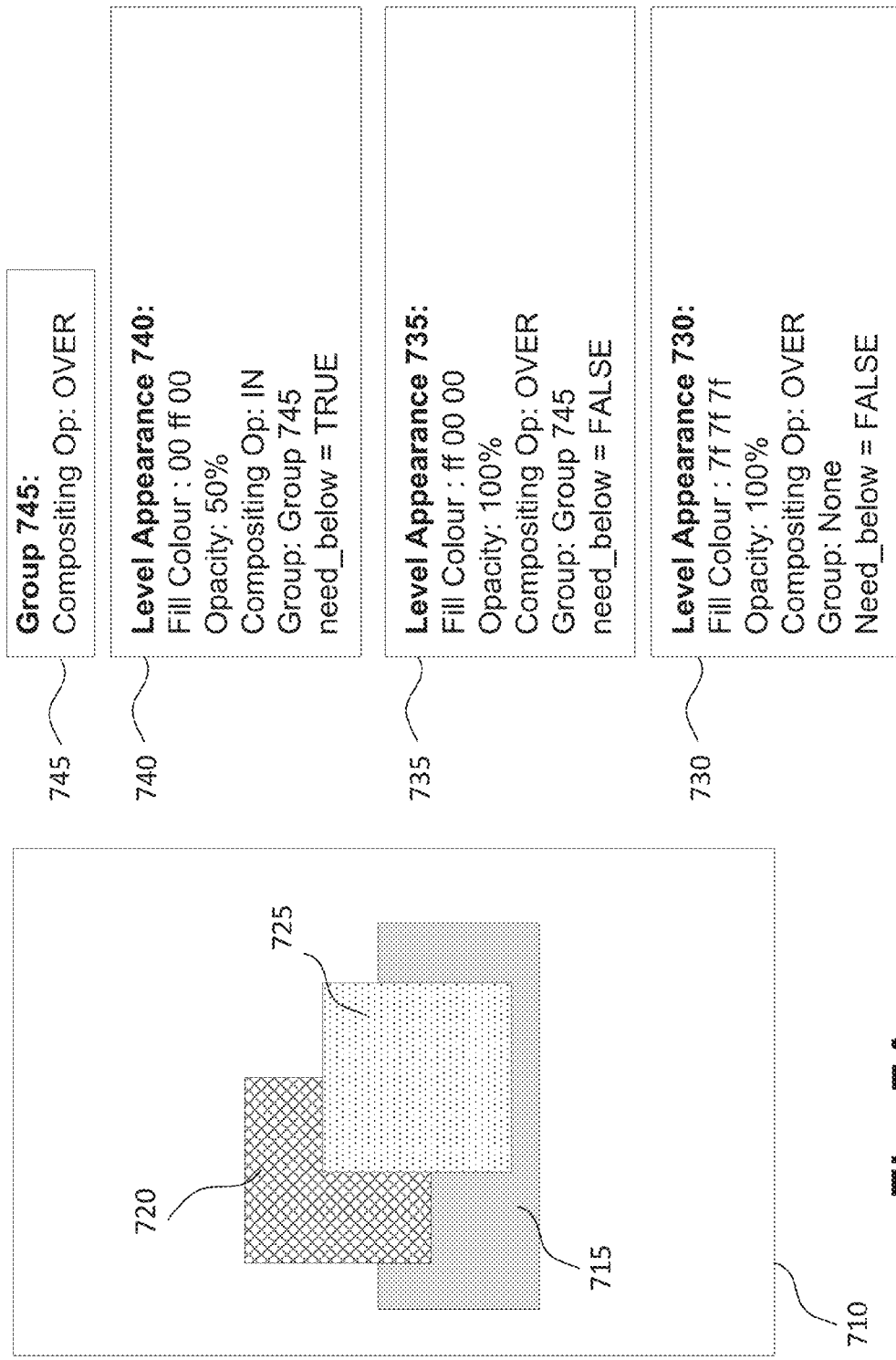
FIGS. 7A and 7B show an example page to demonstrate an implementation according to the present disclosure.

FIGS. 7A and 7B collectively show a first worked example of the formation of a fillmap representation operating on three objects. In this example, a page 710 contains three objects. A first object 715 is a grey opaque rectangle not contained within any group. The object 715 has been painted to the page 710 with the compositing instruction OVER and as such the object 714 will have a need_below flag set to FALSE. Level appearance 730 corresponding to the first object 715 is shown where it is noted that the opacity is 100% and the compositing operation is OVER, representative of need_below being FALSE.

A second object 720 is a red opaque rectangle painted with the compositing instruction OVER. This object 720 will have a need_below flag set to FALSE. Level appearance 735 corresponding to the second object 720 is also shown.

The third object 725 is a blue rectangle with 50% transparency painted with the compositing operator IN. This Object 725 will have a need_below flag set to TRUE. Level appearance 740 corresponding to the third object 725 is also shown.

In this example, both the second object 720 and the third object 725 are contained in a transparency group 745, which has the compositing operator OVER.

In this example, the page 710 will be partitioned into two z-bands. The display list 202 for the first z-band contains the first object 715 and the second object 720. The display list 202 for the second band contains the third object 725. Note that objects are painted in z-order, so when the first z-band display list 202 is created, the third object 725 is yet to be received, and the group 745 is not yet closed.

Figure 8:
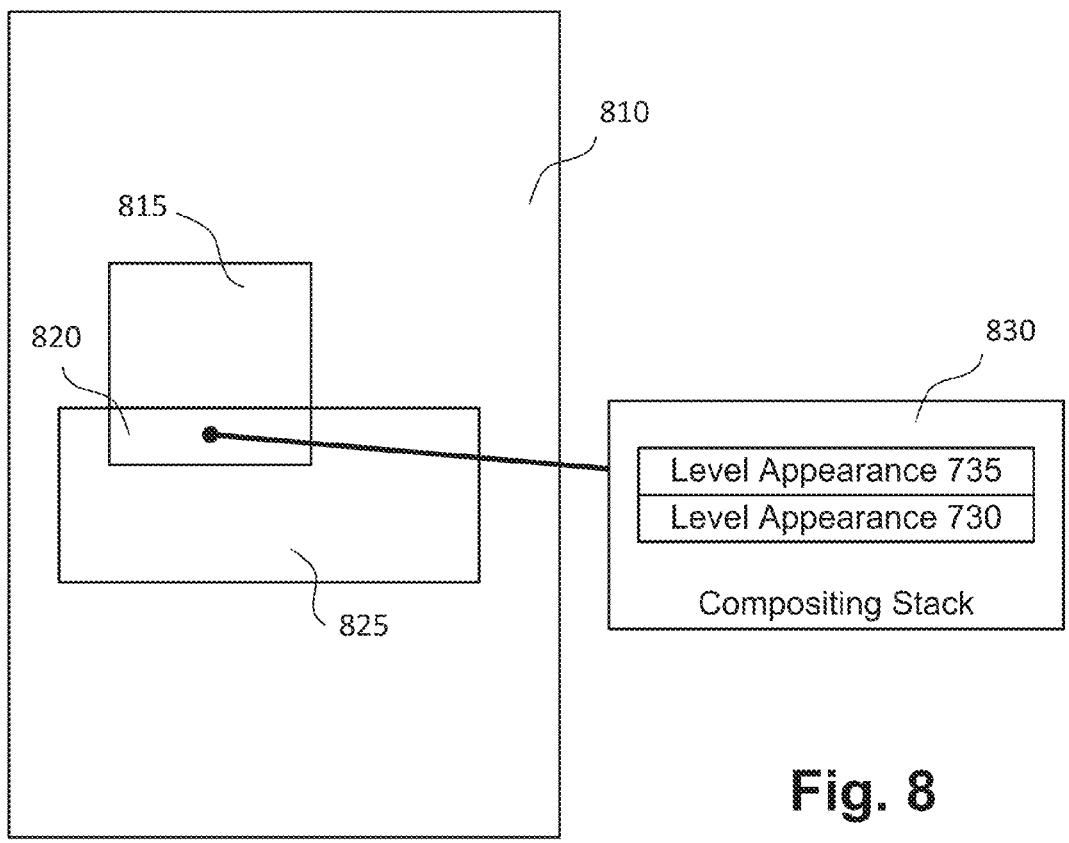
FIG. 8 shows a set of non-overlapping regions and a sample compositing stack generated during processing of the example page in FIGS. 7A and 7B.

FIG. 8 shows the disjoint regions created for the first display list 202, together with an indicative compositing stack 830. When the first display list 202 is processed to produce a z-band fillmap, four disjoint regions (810, 815, 820, 825) are created. This example will consider processing to obtain the contributing objects for the region 820. The process described in FIG. 5 is used to obtain the contributing objects for the region. First, the active objects are sorted in z-order according to step 510. Then the highest active object in the region is examined in step 520 to determine if it is in an open group. When the first display list 202 is processed, group 745 is not yet closed, and so group 745 is marked as open. In this case, since the highest active object 720 is in an open group 745, the refinement flag is set at step 525 and all active objects are added to the set of contributing objects at step 530. Processing then moves to the refinement process. However, in this example, as each contributing object (715,720) is in a different group, the refining process 600 described in FIG. 6 has no effect. This is because the refining process 600 removes obscured objects on a group by group basis. Thus both the contributing objects (715, 720) for the region 820 are used to generate the compositing stack 830 for the region 820.

Figure 9:
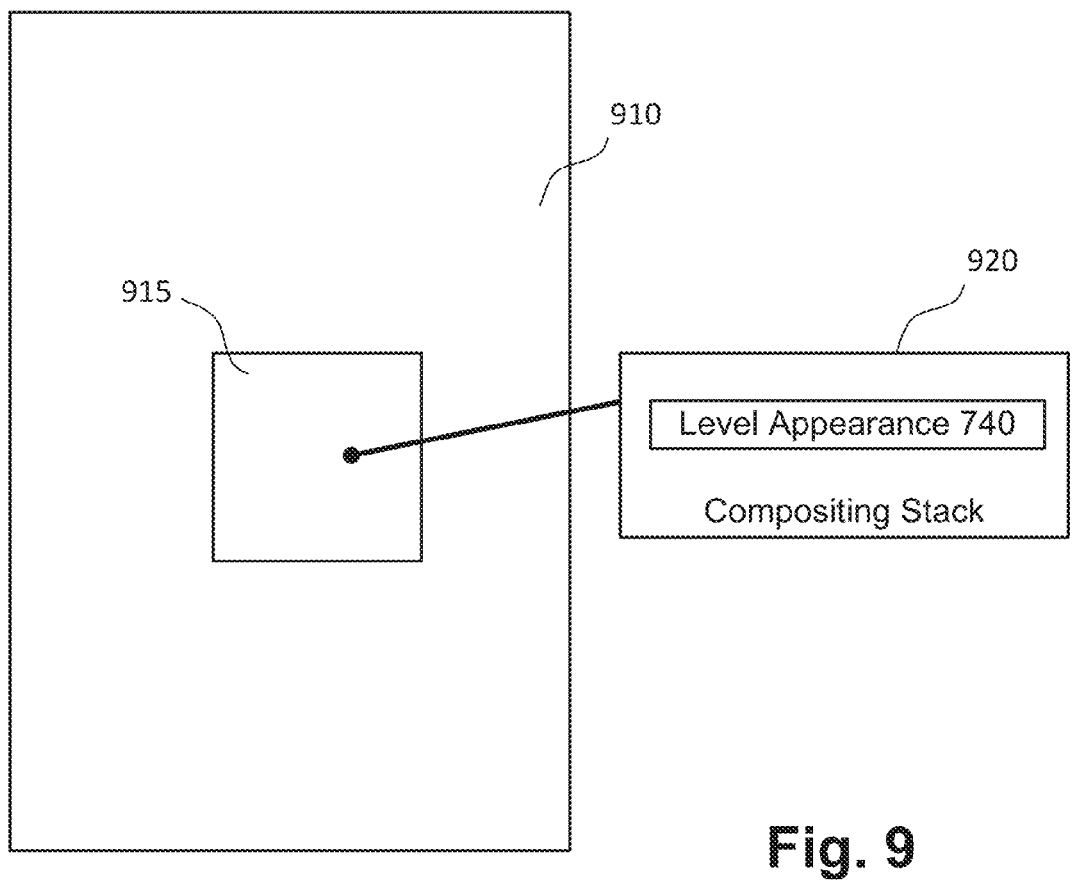
FIG. 9 shows another set of non-overlapping regions and a sample compositing stack generated during processing of the example page in FIGS. 7A and 7B.

FIG. 9 shows the disjoint regions created for the second display list 202, together with an indicative compositing stack 920. When the second display list 202 is processed to produce a z-band fillmap two disjoint regions (910, 915) will be created. This example will consider processing to obtain the contributing objects for region 915. The process 500 outlined in FIG. 5 is used to obtain the contributing objects (in this case, only the object 725) for the region in the particular z-band. First the active objects are sorted in z-order at step 510. Then the highest object (725) in the region is examined at step 520 to determine if it is in an open group. When the second display list 202 is processed, all objects in group 745 have been received and the group 745 is marked as closed. In this case the processing attempts to find the top-most opaque object according to step 540. Since there are no opaque objects in the set of active levels, the process adds, at step 530, the third object to the set of contributing objects. As the refinement flag is not set (i.e. the process does not pass through step 525), processing skips the refinement process. Thus the third object 725 is used to generate the compositing stack 920 for the region 915.

Once the two z-band fillmaps have been produced, they can be merged to produce the final fillmap for the page 710. In this case Level Appearance 730 will be present in the final compositing stack for the region of intersection between the three objects 715, 720 and 725, whereas with standard processing that did not consider open groups it would not. Thus with this arrangement, where the object 725 is a mask, and thus influences the opacity of the group result of object 720 and 725 with respect to the object 715 which is not in the same group, the maintenance of the level appearance 730 in the final compositing sequence is necessary for correct output.

Worked Example B

Figure 10:
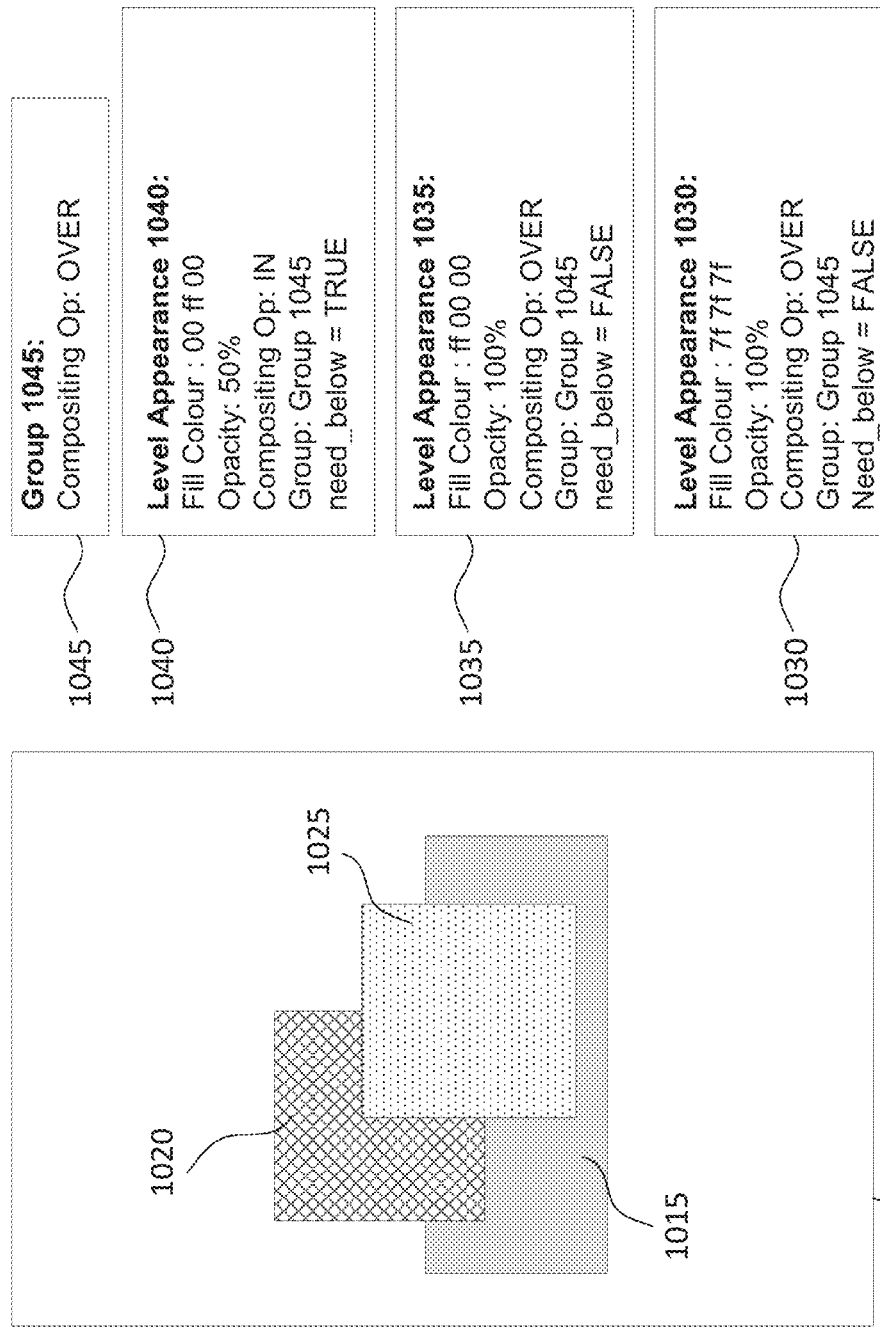
FIGS. 10A and 10B show a further example page.

FIGS. 10A and 10B collectively show a second worked example of the formation of a fillmap representation operating on three objects. In this example, a page 1010 contains three objects. A first object 1015 is a grey opaque rectangle not contained within any group. The object 1015 has been painted to the background with the compositing instruction OVER. This object will have a need_below flag set to FALSE. Level appearance 1030 corresponding to the first object 1015 is shown.

A second object 1020 is a red opaque rectangle painted with the compositing instruction OVER. This object 1020 will have a need_below flag set to FALSE. Level appearance 1035 corresponding to the second object 1020 is shown.

The third object 1025 is a blue rectangle with 50% transparency painted with the compositing operator IN. This object 1025 will have a need_below flag set to TRUE. Level appearance 1040 corresponding to the third object 1025 is shown.

In this example, all three objects (1015, 1020, 1025) are contained in a transparency group 1045, which has the compositing operator OVER.

In this example the page will be partitioned into two z-bands. The display list 202 for the first z-band contains the first object 1015 and the second object 1020. The display list 202 for the second band contains the third object 1025. Note that objects are painted in z-order, so when the first z-band display list is created, the third object 1025 is yet to be received, and the group 1045 is not yet closed.

Figure 11:
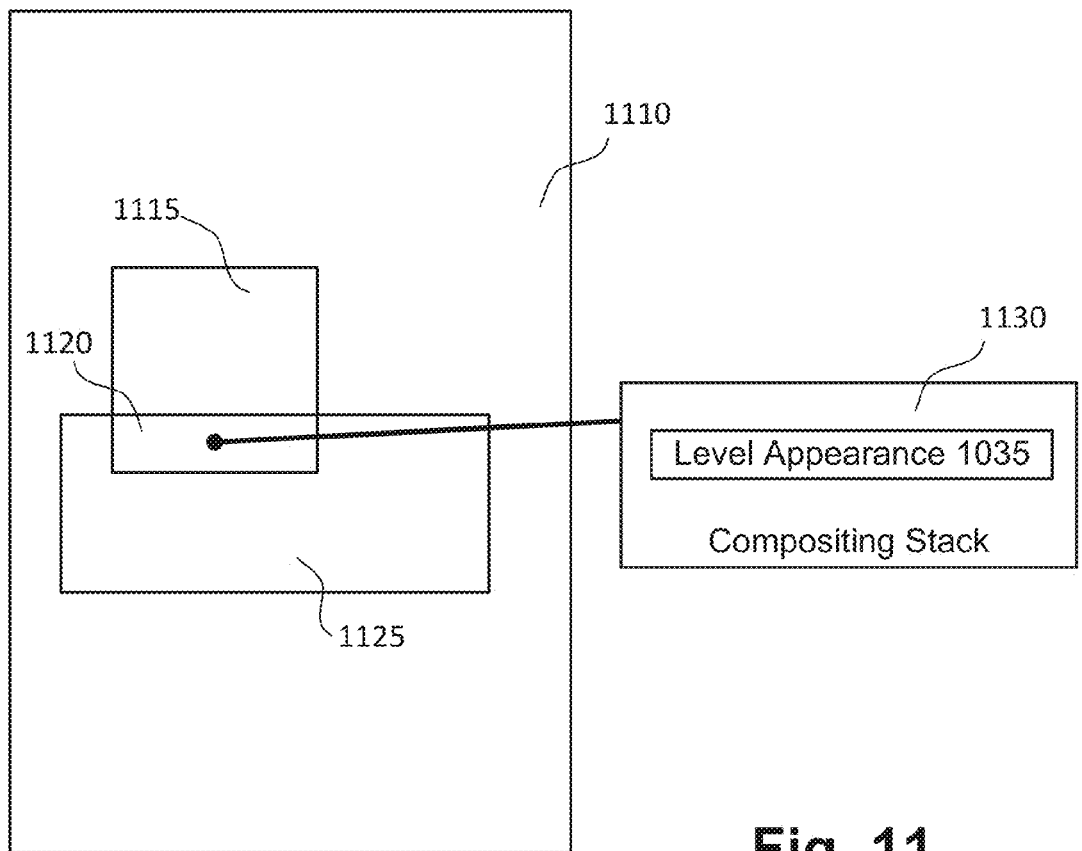
FIG. 11 shows a set of non-overlapping regions and a sample compositing stack generated during processing of the example page in FIGS. 10A and 10B.

FIG. 11 shows the disjoint regions created for the first display list 202, together with an indicative compositing stack 1130. When the first display list 202 is processed to produce a z-band fillmap, four disjoint regions (1110, 1115, 1120, 1125) are created. This example will consider processing to obtain the contributing objects for region 1120. The process described in FIG. 5 is used to obtain the contributing objects for the region. First the active objects are sorted in z-order according to step 510. Then the highest active object in the region is examined at step 520 to determine if it is in an open group. When the first display list 202 is processed, group 1045 is not yet closed, and so the group 1045 is marked open. In this case since the highest active object 1020 is in an open group 1045, the refinement flag is set at step 525 and all active objects are added to the set of contributing objects in step 530. As the refinement flag is set, processing then moves to the refinement process 600 shown in FIG. 6.

In this case the refinement process starts with the highest contributing object 1020 of the region 1120, and sets the CurGroup variable to the group 1045 referred to by the object 1020. As the highest object has need_below set to FALSE, SkipFlag is set to TRUE at step 615. This indicates that all underlying objects in the current group are to be skipped. As there is another active object to process as determined at step 620, the refinement process 600 obtains the next object 1015, and determines at step 630 that the object 1015 is in the current group 1045. As the SkipFlag has been set to TRUE as tested at step 645, the second object 1015 is removed from the set of contributing objects at step 650. As the second object is the last object in the set of contributing objects, the refinement process 600 is then complete. Only the second object 1020, at the corresponding level appearance 1035 is used to generate the compositing stack 1130 for the region 1120.

Processing for the second display list 202 proceeds in the same manner as the second display list 202 from the previous worked example. Once the two z-band fillmaps have been produced, they can be merged to produce the final fillmap for the page. The optimisation achieved by this implementation is that the redundant level appearance is removed which in this case gives the correct rendered output whilst removing unnecessary compositing operations.

Alternative Implementation

An alternative method of determining the contributing objects from a set of active objects is to change need_below flag to TRUE for all opaque objects which are in an open group of the current z-band. In this alternative approach, the active objects are sorted in z-order, so that they can be processed from highest to lowest. Objects in the z-band are then processed in turn until the first opaque object which is not in an open group is encountered. All objects from the highest active object to the highest opaque level which is in a closed group are then added to the set of contributing objects, and the refinement process 600 need not be performed.

INDUSTRIAL APPLICABILITY

The arrangements described are applicable to the computer and data processing industries and particularly for the efficient printing of documents, particularly those possessing may graphical objects.

The foregoing describes only some embodiments of the present invention, and modifications and/or changes can be made thereto without departing from the scope and spirit of the invention, the embodiments being illustrative and not restrictive.

I claim:

1. A method for producing a set of compositing instructions to render a region, the method comprising:
   receiving a plurality of objects corresponding to the region partitioned into at least a first z-order band and a second z-order band, wherein each object is associated with a processing flag identifying whether the underlying objects contribute to rendered output;
   identifying a transparency group spanning at least the first and the second z-order bands, the transparency group including at least some of the received plurality of objects, wherein the transparency group defines compositing of said group with other received objects;
   selecting objects contributing to the rendered output of the region by changing the processing flag associated with at least one object in said first z-order band if said at least one object belongs to the identified transparency group; and
   producing a set of compositing instructions to render the region by processing the selected contributing objects.

2. A method according to claim 1, further comprising determining the active objects in the region for one said band.

3. A method according to claim 1, wherein the region is determined as an intersection of a plurality of objects.

4. A method according to claim 1, wherein the transparency group is identified by group start data and group end data.

5. A method according to claim 1, wherein the transparency group is identified using group end data.

6. A method according to claim 1, wherein the determining of the contributing objects further comprises an obscurance test performed independently for each transparency group within the band.

7. A method according to claim 1, wherein the changing the transparency characteristic comprises changing the transparency characteristic of at least one object in the band contributing to the identified transparency group.

8. A method according to claim 1, wherein the determining of contributing objects further comprises:
   for each object within the band, changing the transparency characteristic so that each object within the band is considered to be a contributing object.

9. A method according to claim 6, wherein the determining of the contributing objects comprises performing the obscurance test independently for each transparency group in the band wherein, for each transparency group, the obscurance test comprises:
   identifying a top opaque object; and
   discarding objects underlying the identified top opaque object in the transparency group from a set of contributing objects.

10. A method according to claim 1, wherein the transparency characteristic is at least one of received with the objects, and determined from an opacity of each object and a compositing operator associated with the object.

11. A method for producing a set of compositing instructions to render a region of a page, the method comprising:
   receiving a plurality of objects associated with the region, the plurality of objects being partitioned into at least two z-order bands, the received objects being associated with at least one transparency group influencing a compositing order for the objects within the page, in which at least one transparency group spans at least two bands;
   establishing a transparency characteristic assigned to at least one object within a z-order band, the transparency characteristic identifying a processing of the object with respect to underlying objects;
   determining those objects that are active in the region for one said band;
   identifying a transparency group in the one band which is active in at least one other band and which contains at least one object active in the region;
   determining contributing objects for the region in the band using the identified transparency group, the determination being performed by changing the transparency characteristic of at least one object in the band; and
   producing a set of compositing instructions to render the region by processing the determined contributing objects.

12. A method according to claim 11, wherein the transparency characteristic comprises a need_below flag.

13. A non-transitory computer readable storage medium having a program recorded thereon, the program being executable by a processor to produce a set of compositing instructions to render a region of a page, the program comprising:
   code for receiving a plurality of objects partitioned into at least two z-order bands, the received objects being associated with at least one transparency group influencing a compositing order for the objects within the page, in which at least one transparency group spans at least two bands;
   code for establishing a transparency characteristic for at least one object within a z-order band, the transparency characteristic identifying a processing of the object with respect to underlying objects;
   code for identifying a transparency group in the one band which is active in at least one other band and which contains at least one object active in the region;
   code for determining contributing objects for the region in the band using the identified transparency group, the determination being performed by at least interpreting a change of the transparency characteristic of at least one object in the band; and
   code for producing a set of compositing instructions to render the region by processing the determined contributing objects.

14. A non-transitory computer readable storage medium according to claim 13, further comprising code for determining the active objects in the region for one said band and the region is determined as an intersection of a plurality of objects.

15. A non-transitory computer readable storage medium according to claim 13, wherein the transparency group is identified by at least one of group start data and group end data.

16. A non-transitory computer readable storage medium according to claim 13, wherein the code for determining of the contributing objects further comprises:
   code for performing an obscurance test independently for each transparency group within the band, the obscurance test comprising:
   identifying a top opaque object; and
   discarding objects underlying the identified top opaque object in the transparency group from a set of contributing objects.

17. A non-transitory computer readable storage medium according to claim 13, wherein the code for determining of contributing objects further comprises:
   code for changing, for each object within the band, the transparency characteristic so that each object within the band is considered to be a contributing object.

18. Computerized apparatus comprising a processor and a memory, the memory having a program recorded thereon, the program being executable by the processor to produce a set of compositing instructions to render a region of a page, the program comprising:
   code for receiving a plurality of objects partitioned into at least two z-order bands, the received objects being associated with at least one transparency group influencing a compositing order for the objects within the page, in which at least one transparency group spans at least two bands;
   code for establishing a transparency characteristic for at least one object within a z-order band, the transparency characteristic identifying a processing of the object with respect to underlying objects;
   code for identifying a transparency group in the one band which is active in at least one other band and which contains at least one object active in the region;
   code for determining contributing objects for the region in the band using the identified transparency group, the determination being performed by at least interpreting a change of the transparency characteristic of at least one object in the band; and
   code for producing a set of compositing instructions to render the region by processing the determined contributing objects.

19. A printer comprising computerized apparatus according to claim 18.

\* \* \* \* \*